April 15, 1952 — C. G. SCHULZE — 2,592,960
CONCRETE ROADWAY FINISHING MACHINE
Filed Sept. 23, 1946 — 7 Sheets-Sheet 2

INVENTOR
CLARENCE G. SCHULZE
BY
ATTORNEYS

April 15, 1952

C. G. SCHULZE

2,592,960

CONCRETE ROADWAY FINISHING MACHINE

Filed Sept. 23, 1946

INVENTOR
CLARENCE G. SCHULZE
BY *Mason Graham*
ATTORNEYS

April 15, 1952   C. G. SCHULZE   2,592,960
CONCRETE ROADWAY FINISHING MACHINE
Filed Sept. 23, 1946   7 Sheets-Sheet 4

INVENTOR
CLARENCE G. SCHULZE
BY
ATTORNEYS

April 15, 1952  C. G. SCHULZE  2,592,960
CONCRETE ROADWAY FINISHING MACHINE
Filed Sept. 23, 1946  7 Sheets-Sheet 5

INVENTOR
CLARENCE G. SCHULZE
BY
ATTORNEYS

INVENTOR
CLARENCE G. SCHULZE
BY
ATTORNEYS

April 15, 1952     C. G. SCHULZE     2,592,960
CONCRETE ROADWAY FINISHING MACHINE
Filed Sept. 23, 1946     7 Sheets-Sheet 7

INVENTOR
CLARENCE G. SCHULZE
BY
ATTORNEYS

Patented Apr. 15, 1952

2,592,960

UNITED STATES PATENT OFFICE 2,592,960

CONCRETE ROADWAY FINISHING MACHINE

Clarence G. Schulze, Los Angeles, Calif., assignor to Madsen Iron Works, Inc., a corporation of California Application September 23, 1946, Serial No. 698,598

12 Claims. (Cl. 94—45)

The present invention relates to concrete highway construction and more particularly to the smoothing and finishing of concrete highway paving.

In laying a concrete highway paving slab, it is customary practice, after an initial leveling and preparation of the ground upon which the slab is to be laid, to install sheet metal side forms to retain the concrete between the desired limits of the slab. The upper edges of the side forms customarily are used as a guide for supporting the striking off and finishing apparatus used in the various steps in laying and finishing the pavement.

It is not many years since the finishing of concrete pavement was principally a manual operation wherein a number of skilled and semi-skilled finishers followed a paving machine which mixed and poured the concrete. By such hand finishing methods, it was virtually impossible to eliminate longitudinal undulations in the pavement, which became increasingly more objectionable as the average speed of vehicles using the highways increased.

In recent years numerous developments have been made in paving construction equipment, most of which developments assisted in improving the quality of the finished roadway and cut down on the number of man hours required to lay and finish the pavement. This trend has now reached a point where many contractors feel that they are overburdened with expensive and heavy machinery which is difficult to transport from one job to another, and when idle represents a considerable loss due to the amount of capital tied up in such equipment.

Cement highway finishing machines which are at present available are unsuited for use in making the wide paving strips required on some of the wider highways now being installed in numerous localities throughout the country, and also for the paving of wide strips required in the making of concrete runways for airports. Such finishers require some prefinishing operations to be performed after the concrete has been laid by the paving machine before the finisher can operate satisfactorily. Particularly in cases where the side forms are in bad condition, or have been displaced somewhat during the preliminary phases of paving, none of the presently known equipment is able to produce the most desirable type of finished surface.

The most desirable surface finish for a concrete roadway is generally conceded to be one which is smooth in that it is without bumps or undulations either large or small, but which has a sufficiently rough texture so that it will assist in preventing skidding of automobiles driven on the finished pavement. The lines of texture should run longitudinally of the roadway, since a marked transverse texture in the roadway produces eye weariness and hum at certain speeds.

A principal cause of undulations in finished highway surfaces has been found to be subsidence of the mass after a finishing operation has been performed. It is desirable, therefore, to perform the final finishing operation when the concrete mass has completely subsided. This has been difficult, if not impossible, with most of the finishing equipment now in use.

An object of the present invention is to make an improved concrete highway surface finisher.

Another object is to make a concrete highway finisher which is readily adjustable as to width.

Another object is to make a concrete highway finisher having a basic structure suitable for use on standard highway paving and which is capable of being widened by successive increments to a predetermined maximum width.

Another object is to make a concrete paving finisher having front and rear frames adapted to ride on paving side frames as a track with longitudinal frame members connecting the frames for minimum distortion of position by irregularities in the side frames, a road finishing device being adjustably suspended from the connecting frames.

Another object is to make a concrete paving finishing machine adapted initially to distribute surface portions of a concrete highway paving slab to a condition of smoothness and thereafter to finish the surface of such slab to a required texture.

Another object is to provide a concrete paving finishing machine with means for maintaining the surface of the paving in condition for finishing until substantially final subsidence of the mass has occurred.

Another object is to make a concrete paving finishing machine adapted to vary surface conformation to adjust for a superelevated curve.

In order to attain these objects, there is provided in accordance with one feature of the invention, a concrete paving finishing device comprising a motor driven forward frame and a connected rear frame, the forward frame and the rear frame being separately and individually provided with multiple wheeled support, with connecting beams pivotally mounted substantially centrally of the length of each of the front and rear wheeled frames, and cement finishing and distributing members adjustably mounted on the connecting members as a frame for maximum smoothness of operation of the frame, the mechanism being provided with means for vibrating a surface portion of the pavement being finished, and being arranged to change the relative curvature of finishing elements of the device automatically to diminish the crown of the pavement on a superelevated curve.

These and other objects and advantages of the invention will be set forth in the following description and accompanying drawings, of which there are seven sheets. In the drawings.

Referring to the detailed construction and operation of the mechanism illustrated in the drawings, a basic machine illustrated in Figs. 1-3 will be described initially. In this machine, designated generally by the letter M, a float support frame 10 is adjustably suspended from a pair of longitudinally disposed side frames or girders 11 and 12. These girders are pivotally mounted at their front and rear ends respectively on wheeled support frames or carriages 13 and 14.

The front carriage 13 comprises three assembled units 15, 16 and 17. The central carriage unit 15 is of rectangular open box girder construction and has a motor power unit such as a gasoline engine 18 mounted thereon. This central unit 15 is built of suitable structural material, such as angle and channel iron. The outer ends of the central frame unit are rectangular and are adapted to be bolted to similar registering inner end portions 19 and 20 of the carriage end units 16 and 17. Each end unit 16 and 17, as shown in Fig. 3, is of open girder triangular construction as viewed in elevation, and has a pair of bearing journals 21 mounted on the underside of the forward and rear ends thereof respectively. Wheel axles 23 are journaled in these bearings, and suitable flanged wheels 25 which are adapted to ride on pavement side forms 27 are secured to the outer ends of these axles. An adjustable collar 28 is provided on each axle to retain the axle in longitudinally adjusted position with respect to the bearings 21. Each front axle 23 is connected at its outer end by a suitable splined connection 29, to a drive shaft 30 through a universal joint 31. The inner end of the drive shaft 30 is connected, through a second universal joint 32 to the shaft 33 of a transmission gear box 34. The engine 18 is connected through a usual clutch to suitable gear mechanism mounted in the gear box 34.

The rear carriage 14 is composed of three sections which are similar, except for the absence of the motor drive mechanism, to the three sections of the front carriage. These sections of the rear carriage comprise a central section 22 and outer sections 24 and 26.

Figure 1:
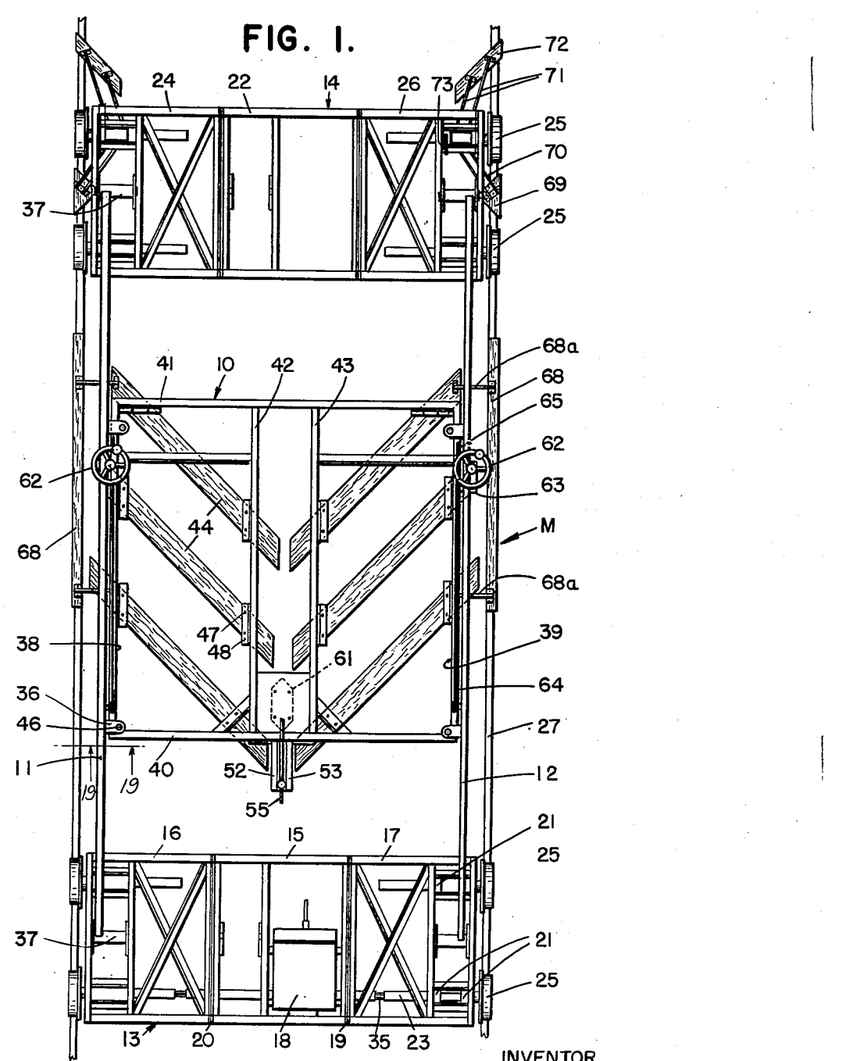
Fig. 1 is a plan view of a basic arrangement of a cement paving finisher embodying the present invention.
Figure 3:
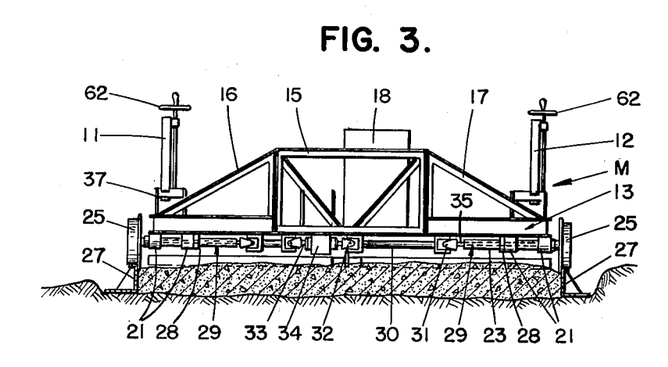
Fig. 3 is a front end elevational view of the device shown in Fig. 1.

The axles, and thereby the wheels, may be adjusted axially outwardly a desirable distance, for example eighteen inches each, from the position illustrated in Figs. 1 and 3. The splined connection 29 between the outer universal joint 31 of each driven front wheel and its axle may comprise an externally splined shaft 35 secured to the outer portion of the universal joint 31. This splined shaft is somewhat longer than the maximum desired wheel adjustment which in the present example may be assumed to be eighteen inches. Each driven front axle 23 is tubular and is internally splined telescopically to receive the splined shaft 35 for longitudinal adjustment therein.

The two longitudinal frame girders 11 and 12 are pivotally connected at each end thereof to bearing members 37 mounted midway of the length of the front and rear carriages 13 and 14. This method of mounting the longitudinal frame girders reduces vertical displacement of the longitudinal girders 11 and 12 and the supported float frame 10 on a vertical displacement of any of the wheels, such as would be caused by running over an irregularity in the tracks formed by the top surface of the side forms 27.

The rectangular float support frame 10 is constructed with channel iron side frame members 38 and 39 and similar channel iron front and rear members 40 and 41. A pair of central longitudinal bracing members 42 and 43 are secured to extend between the front and rear float frame members 40 and 41.

Figure 19:
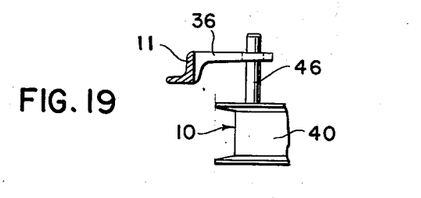
Fig. 19 is a detail fragmentary sectional view taken on line 19—19 of Fig. 1.

The float frame 10 has an upwardly extending pin 46 mounted at each of its four corners. Each of these pins rides in an opening in an anchor bracket 36 secured to the inner side of the longitudinal side girders 11 and 12, as shown in Fig. 19. This mounting secures the float frame against lateral displacement with respect to the main body of the machine while permitting limited vertical adjustment of the float frame.

Figure 16:
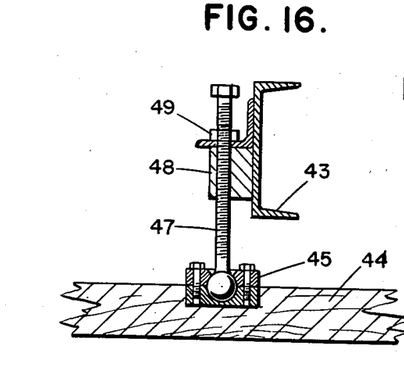
Fig. 16 is an enlarged fragmentary sectional view taken on the line 16—16 of Fig. 5.

A plurality of floats 44 which preferably are of tough, close grained wood, such as mahogany, are mounted diagonally beneath each central bracing member and its corresponding side frame member. The floats are mounted for vertical adjustment on their supporting frame members, one satisfactory method of support being by socketed mounting plates 45, mounted on the upper surface of each float member, as shown in Fig. 16. These plates 45 rotatably receive the ball shaped lower ends of adjusting bolts 47 which are threaded through openings in brackets 48 secured to the frame members 40, 41, 42 and 43, as required. Lock nuts 49 secure the floats in adjusted position. The float members are disposed at an angle of approximately 45° from the longitudinal center line of the machine in the form of V's with their apexes pointing forward. The forward or apex ends of all three pairs of floats illustrated are spaced apart, the forward pair being spaced apart a slightly greater distance than that separating thte apex ends of the two rear pairs.

A deflector plate support frame comprises a pair of angle iron brackets 52 and 53 which are mounted on the front transverse float frame member 40 to extend forwardly therefrom. A bearing block 54 having a vertical shaft bearing therein is mounted between the forward ends of the brackets 52 and 53. The bearing block is split vertically and is provided with clamp bolts 56 to hold the shaft in angularly adjusted position. A deflecting plate 55 which may be of relatively heavy steel plate is secured to a shaft 57 vertically mounted in the bearing block 54. Collars 58 and 59 are mounted one above and one below the bearing block 54 to hold the shaft in vertically adjusted position. The deflector blade should be adjusted with its lower edge at substantially the same level as the bottoms of the floats. A tiller handle 60 is secured to the top of the shaft 57 by means of which the deflector plate may be pivoted to a desired position to deflect a windrow of cement which is discharged between the apex ends of the floats while the device is traveling rearwardly, toward one side or the other, as desired, when the device again is moved forwardly. This feature of the device is especially important in the finishing of a superelevated curve. On such curves, working the mass of cement has a tendency to cause a downward flow of the still plastic concrete toward the low side of the pavement. By using the deflector plate a required amount of the material can be deflected toward the high side of the curve to provide for smooth and accurate finishing throughout the entire width of the slab.

A diamond or lozenge shaped diverter block 61 is mounted on a support plate 66 substantially midway beneath the apexes of the forward two pairs of floats. The bottom of this block is adjusted to substantially the level of the lower surfaces of the inner ends of the forward pair of floats, so that any mortar deposited in a central windrow by the operation of the machine while traveling in either direction will be diverted by this diamond shaped block. This causes a working of the windrow material, which helps to keep it in a plastic workable condition, and also exerts a finishing action on the central strip of pavement between the apex ends of the floats.

After the position of the floats relatively to the float frame has been adjusted, as in initially setting up the machine or after installing replacement floats thereon, it usually is unnecessary to readjust the floats with respect to the float frame. It is necessary, however, frequently during the operation of the machine in finishing a slab, to adjust the position of the entire float frame 10 and its connected floats as a unit. This is true since in beginning a cement finishing operation the frame and its associated floats will be elevated so as to work on the higher portions of the irregularities existing in the pavement at that time. The frame 10 with its associated elements is gradually lowered as the finishing progresses and the surface of the pavement approaches its final smooth finished form.

In order to accomplish the raising and lowering of the float assembly required for such adjustment, a hand wheel 62 may be provided on each side of the machine. Each hand wheel is connected through an ordinary worm and gear drive housed in a gear box 63, to cables 64 and 65 which are secured to fasteners 67 in the float frame 10.

An elongated track cleaning bar 68, which may be of wood similar to that of which the floats are constructed, is mounted on brackets 68a secured to the floats so that the bar 68 will ride on the side forms during the operation of the machine. As the machine is drawn back and forth during the finishing operations on the pavement, the bar 68 retains cement which is displaced laterally from the pavement by the floats from going over the side forms.

A triangular side windrow diverter block 69 is mounted on a pair of bracket arms 70, which are pivoted at their rear ends to each side of the rear carriage 14. A similar pair of bracket arms 71 are connected to pivot with each pair of the arms 70. These arms 71 extend rearwardly and have a diagonally disposed windrow diverter block 72 mounted on the rear ends thereof. Each pair of forwardly extending brackets 70, and the rearwardly extending brackets 71, connected thereto, are connected to a hand lever 73 which is adapted to have releasable engagement with a notched quadrant 74 in three adjusted positions of the lever. When the lever is in the forward position illustrated in solid lines in Fig. 2 the forward triangular diverter block is moved downwardly to ride on the side forms 27, while when the lever is moved rearwardly to the dotted line position of Fig. 2 the diagonal diverter block 72 is moved downwardly onto the side forms. In an intermediate central position of the lever 73 both blocks will be raised free of the pavement for transporting the machine when no work is being performed.

Figure 2:
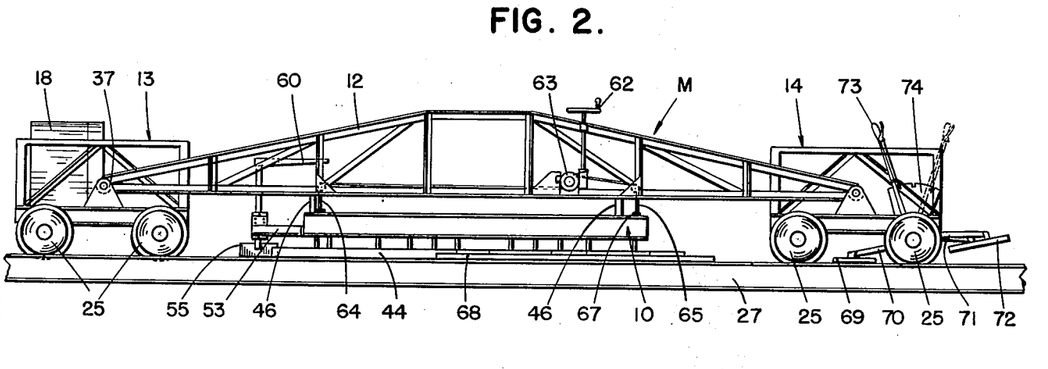
Fig. 2 is a side elevational view of the device shown in Fig. 1.

During the initial and intermediate passes of the machine the lever 73 is maintained in the forward solid line position illustrated in Fig. 2, which lowers the triangular diverter block 69 and causes it to divert any windrows which may be left by the operation of the machine inwardly away from the wheels and into the path of the floats, where it again is picked up by the floats and distributed, upon a successive rearward movement of the machine, to any low spots which may still be present in the pavement. This triangular diverter block also exerts a positive smoothing action which works the cement adjacent the side forms down to a condition level with the tops of the side forms. Since the flanges of the wheels have a tendency to displace a certain amount of concrete during the operation of the machine, this block also tends to deflect inwardly and to smooth out any material thus displaced.

On the final forward finishing movement of the machine, the hand lever 73 is moved to its rearward dotted line position of Fig. 2 to bring the diagonally disposed float block 72 downwardly into operative position. On a final forward movement of the machine this block deflects laterally overboard any windrows of cement which may be produced by the floats or wheels on this final operation of the machine.

Figure 4:
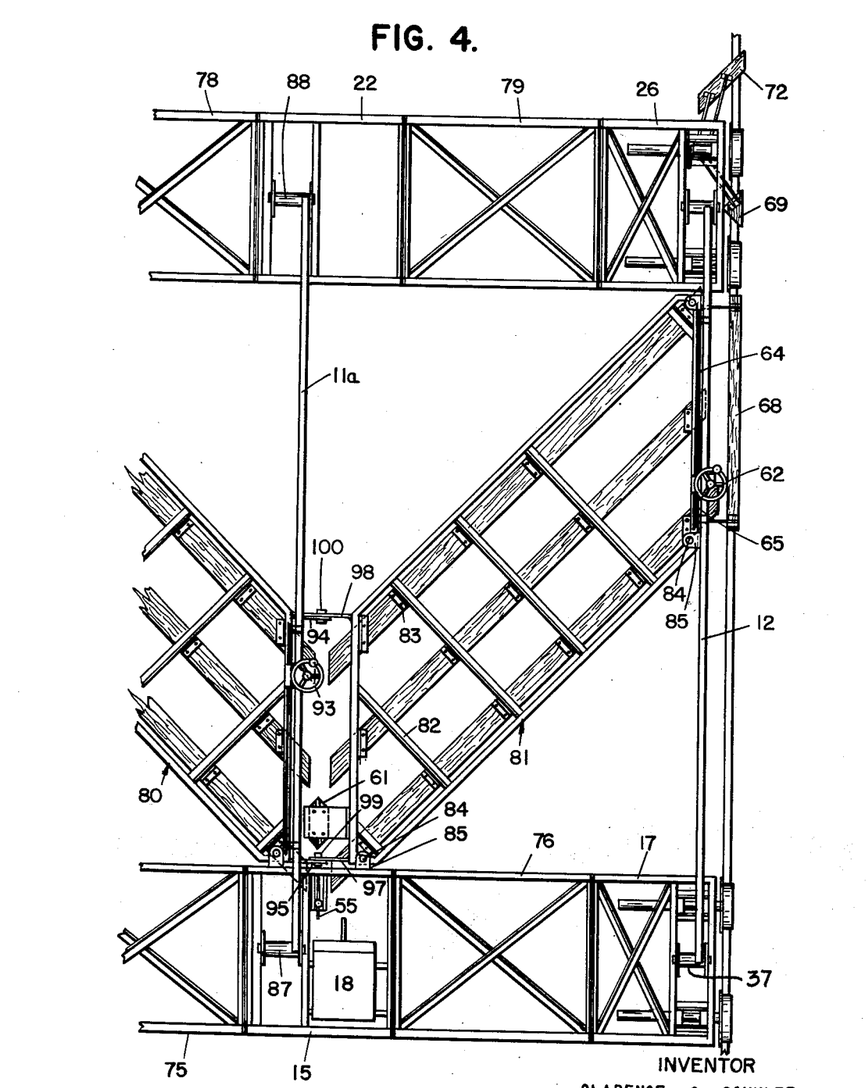
Fig. 4 is an enlarged fragmentary plan view of a portion of a widened development of the basic structure of Fig. 1.
Figure 5:
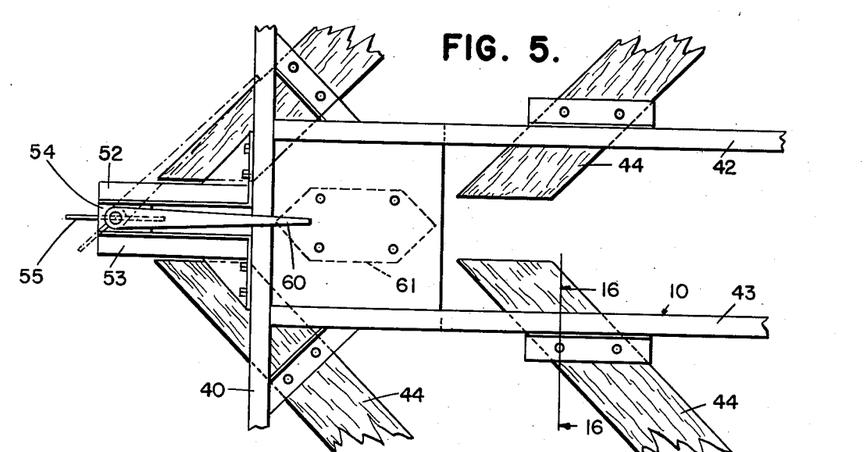
Fig. 5 is an enlarged fragmentary plan view of a forward central portion of a float assembly shown in Fig. 1.
Figure 6:
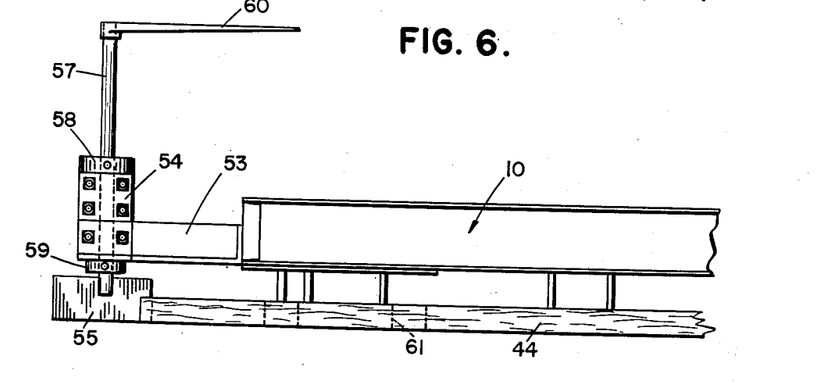
Fig. 6 is a view in side elevation of the structure shown in Fig. 5.
Figure 7:
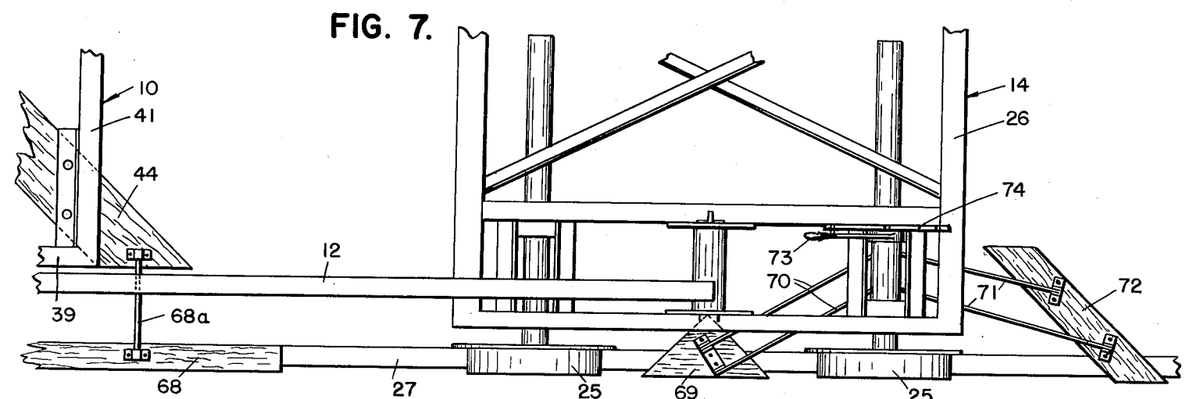
Fig. 7 is an enlarged fragmentary plan view of the left hand rear corner of the machines shown in Figs. 1, 2, 3 and 4.

It will be noted in the minimum adjusted width arrangement of the machine illustrated in Figs. 1-3 that but a single float frame is employed. Fig. 4 illustrates the machine with accessory widening equipment installed, and modifications made to extend it to a substantially greater width than that of the basic machine illustrated in Figs. 1-3 inclusive.

In the modified machine illustrated in Fig. 4, some of the same units are employed as in the basic machine of Figs. 1-3. Where these basic units are employed they are given the same reference numbers as in the description of them in connection with the first three figures of the drawings.

The basic machine shown in Figs. 1-3, inclusive, may be assumed to have an overall minimum adjusted width or tread of twelve feet. In the modification shown in Fig. 4 a pair of intermediate rectangular box girder carriage frame units 75 and 76 are interposed between the basic carriage frame units so as to increase the width of the carriages. In the modification shown in Fig. 4, the front carriage has the same central or engine mounting unit 15 and the same outer wheeled carriage units 16 and 17 as the machine shown in Figs. 1-3.

Between these three basic units the box girder units 75 and 76 are interposed. The interposed box girder units have rectangular ends which are adapted to bolt to the outer ends of the center frame unit 15 and the inner ends of the outer wheeled units 16 and 17. These interposed box girder units may be assumed, for the purpose of the present description, to be each six feet long, thereby adding an increment of twelve feet to the total width of the front carriage. Similar box girder units 78 and 79 are bolted similarly in interposed position between the basic units 22, 24 and 26 of the rear carriage.

A pair of longitudinal frame girders 11 and 12, which may be the same as those of the machine described in Figs. 1-3, are pivotally connected at their front and rear ends respectively to the outer wheeled carriage units 16 and 17 of the front carriage and 24 and 26 of the rear carriage.

A third longitudinal frame girder 11a is pivotally mounted at its front and rear ends respectively on pivotal mountings 87 and 88 which are similar to, and in axial alignment with, the pivotal supports 37 for the outer longitudinal frame girders. The pivotal supports 87 and 88 for this central girder are provided as part of the basic central front and rear carriage units, but the central girder 11a is not employed in the basic or minimum width machine illustrated in Figs. 1-3. This central longitudinal girder may be the same as the outer girders 11 and 12, but is reversed end for end in mounting so that all the longitudinal girders thus may be standard. It will be noted that the so-called central girder is not in the exact center of the machine, but is offset slightly to the right so as to be over the inner end of the right hand float frame, now to be described.

The floats in this modified form of the device shown in Fig. 4, instead of all being mounted on a single rectangular frame, as in the embodiment illustrated in Figs. 1-3 inclusive, are mounted on two oppositely disposed rhomboid shaped frames 80 and 81. The major axes of these frames are disposed angularly rearwardly substantially parallel with the center lines of the floats. The sides and ends of the rhomboidal frames are of channel iron, and a plurality of transverse frame members 82, which may be of angle iron, are mounted perpendicularly to the longer sides of the frames, as shown in Fig. 4. These transverse frame members add rigidity to the frames and provide mounting supports for the floats. A plurality of threaded support brackets 83 are mounted on the frame members over each of the floats, and are connected to the floats by suitable adjusting means which may be similar to the ball headed bolts 47 and socketed plates 45 previously described, Figs. 1-3.

The float frames 80 and 81 are secured to the longitudinal girders in a manner similar to that previously described for frame 10, Fig. 19, to permit vertical adjusting movement of the float frames, while at the same time retaining the frames against side sway. This mounting is accomplished by a plurality of vertical pins 84 similar to pins 46 mounted on the forward inner corner and on the front and rear outer corners of each of the float frames. These pins are inserted slidably in bracket bushings 85 similar to bracket 36. The bushings for the forward inner corner pins are mounted on the rear of the central front carriage unit 15, while those for the two outer corner pins are mounted on the lower portion of the longitudinal outer frame girders 11 and 12 respectively. The bushings should receive the pins with a free sliding fit so as to permit a slight relative tilting of the float frames and their supporting structure without binding.

Float frame suspension cables, which may be the same cables 64 and 65 referred to in Figs. 1-3 are connected to the outer front and rear corners of each of the float frames 80 and 81. These suspension cables are connected through the gear boxes 63 to the hand wheels 62, as previously described, for the basic machine of Figs. 1-3. A hand wheel 93 is provided on the central longitudinal girder 11a to control similar suspension cables connected to the front and rear inner corners respectively of the right hand float frame 80.

Bracket arms 94 and 95 are secured on the inner front and rear ends respectively of the right hand float frame 80. Similar but oppositely extending bracket arms 97 and 98 are secured to the other float frame 81. The brackets are provided with aligned holes at their central or free ends in which pivot pins 99 and 100 are mounted. The float frames thus are hingedly connected together about the axes of the pins 99 and 100.

The remainder of the machine of Fig. 4, including longitudinal track cleaning bars 68, the triangular and diagonally disposed diverter blocks 69 and 72 on the rear carriage, the adjustable deflector plate 55, and the lozenge shaped diverter block 61 are all substantially the same as in the basic machine illustrated in Figs. 1-3 inclusive.

Figure 8:
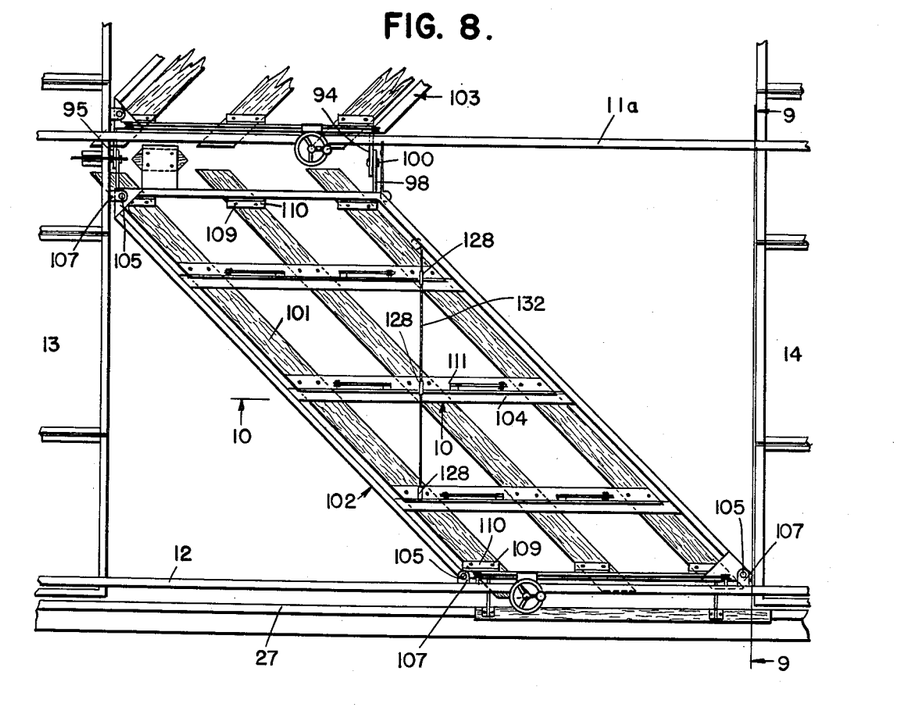
Fig. 8 is an enlarged fragmentary plan view of a modified form of float frame mounted on a machine of the general type shown in Fig. 4.
Figure 9:
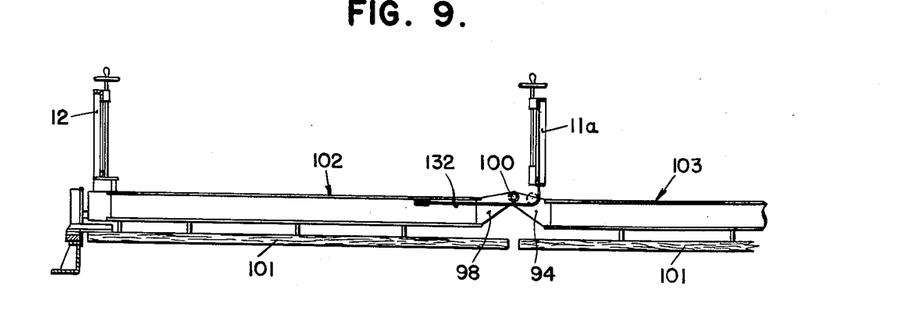
Fig. 9 is a sectional view taken on the line 9—9 of Fig. 8.
Figure 10:
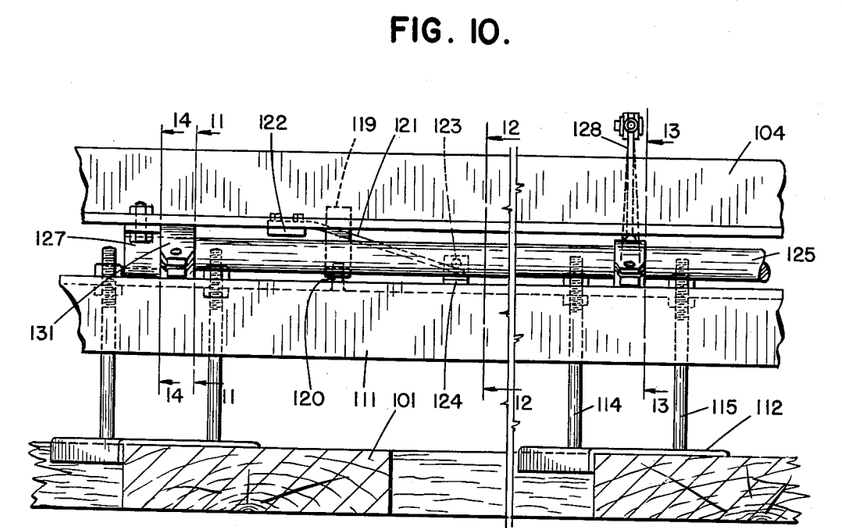
Fig. 10 is an enlarged fragmentary sectional view taken on the line 10—10 of Fig. 8.
Figure 11:
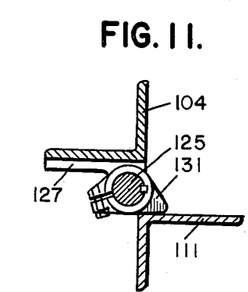
Fig. 11 is an enlarged fragmentary sectional view taken on the line 11—11 of Fig. 10.

A further modification is shown in Figs. 8-15 inclusive. The purpose of this latter modification is to permit changing the longitudinal curvature of the floats while the machine is performing a finishing operation on a pavement slab. This permits variation of the crown contour of the slab being finished in accordance with specified requirements. The ability to produce such a variation is particularly desirable when going from a straight section of roadway into a super-elevated curve. This feature is important since it is desirable to have less crown on a super-elevated curve than on a straightaway stretch of roadway. The curvature of the crown preferably should diminish gradually as the road enters the curve. In order to provide for varying the longitudinal curved shapes of the floats without the necessity of adjusting the floats individually, as by means of the bolts illustrated and described in connection with previous views of the drawings, floats 101 are mounted on float frames 102 and 103 as shown in Figs. 8–10 inclusive.

The float frames 102 and 103 may be generally similar to the float frames 80 and 81 illustrated in Fig. 4, having rhomboid shaped exterior frames of channel iron but preferably having intermediate frame members 104 mounted parallel to the inner and outer ends of the float frames. The float frames 102 and 103 are secured for vertical adjustment by means of pins 105 and brackets 107 similar to those illustrated in Fig. 4. The floats 101 preferably are of tough close grained wood with their ends secured to the end members of the float frames by ball ended bolts 109, similar to the bolts 47 of Figs. 1–3. These bolts are mounted in threaded angle iron brackets 110 which are bolted to the end channels of each float frame. The ends of the floats thus may be adjusted to required vertical position with respect to the float frame in the same manner as described for the embodiment shown in Figs. 1–3 and 4, and the ends of the floats thus are not included in the feature of controlled adjustability about to be described.

An angle iron float control or warping member 111 (see, for example, Figs. 10 and 11) is mounted in relatively inverted position beneath each of the longitudinal intermediate float frame members 104, with the downwardly extending flange of each inverted lower angle iron member substantially below the upwardly extending flange of its corresponding intermediate float frame member 104. Each inverted lower angle iron frame member 111 is secured to each of the floats where it overlies these floats as by means of a saddle plate 112 bolted on top of the float. The connecting bolts are countersunk in recesses 113 in the lower sides of the floats so that the floats can wear down a substantial distance before the heads of the bolts will be exposed.

A pair of upwardly extending threaded rods 114 and 115 (see Figs. 10 and 13) are secured to each saddle plate 112 as by welding, and the upper ends of these rods are secured as by adjusting nuts 117 and 118, to the lower or inverted angle iron members 111. A pair of angle iron brackets 119 (see Figs. 10 and 12) are secured to a side of each of the longitudinal intermediate frame members 104 to extend downwardly and laterally therefrom to overlie the lower inverted angle iron members 111. Each of these brackets has a hole therein slidably to receive a pin 120 (see Fig. 17) mounted on the lower angle iron member 111. This connection secures the floats against lateral displacement with respect to the float frame and permits limited vertical adjusting movement of the lower inverted angle iron members 111 and the intermediate portions of the floats to which these inverted angle iron members are connected.

Figure 12:
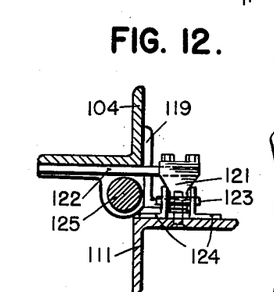
Fig. 12 is an enlarged fragmentary sectional view taken on the line 12—12 of Fig. 10.
Figure 15:
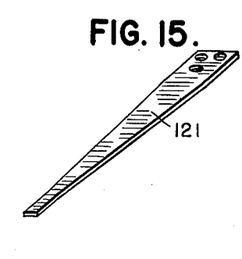
Fig. 15 is a view in perspective of a float supporting leaf spring.

A leaf spring 121 is clamped to a bracket 122 on each side of the central portion of each of the intermediate longitudinal angle iron frame members 104 to extend outwardly toward the ends of these angle iron members. The end portion of each of these leaf springs is tapered, as best shown in Figs. 12 and 15, and the narrow tapered end portion is inserted beneath a short rod 123 mounted in angle iron brackets 124 secured to the top of the lower angle iron members 111. The action of these leaf springs tends to urge the lower inverted angle iron members and their connected floats upwardly toward the upper intermediate longitudinal frame members 104.

Figure 14:
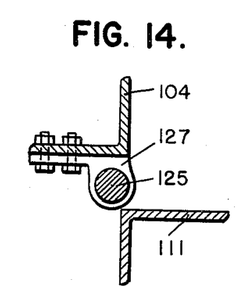
Fig. 14 is an enlarged fragmentary sectional view taken on the line 14—14 of Fig. 10.

A torque rod 125 is mounted in the space between each of the intermediate longitudinal frame members 104 and its corresponding inverted lower angle iron member 111. The torque rod 125 is pivoted in bearings 127 which are secured to the underside of the horizontal flange of the intermediate frame members 104, as best shown in Figs. 10 and 14.

A cam operating lever 128 (see Figs. 8, 10 and 13) is secured to each torque rod 125 as by means of a key 129 and a clamp screw 130. These cam operating levers preferably are mounted in substantial lateral alignment with each other at the intersections of each of the floats with the longitudinal intermediate frame members. This arrangement is shown in Fig. 8.

An auxiliary cam 131 (see Fig. 11) is keyed and clamped to each torque rod 125 above each of the other floats than that having the cam lever 128 thereabove. The cam levers 128 are connected to each other as by means of cables 132 (see Figs. 8, 10 and 13) so as to move in synchronism with each other when the cable is pulled.

The cables are run over suitable guide pulleys as required, and the inner end of each cable 132 may be secured to the longitudinal center girder member 11a so that vertical movement of the float frame relatively to the girder will produce an adjusting movement of the cam levers 128, and thereby the torque rods 125, to vary the camber of the floats. If desired, however, instead of connecting the cables 132 to the girder 11a, a separate hand or engine driven control, not shown, may be provided to operate these cam levers independently of any relative motion of the float frames with respect to the main body of the machine.

In setting up a machine having this adjustable camber form of float mounting, the camber of the floats is adjusted, with the torque rods in normal or unoperated condition, by means of the saddle mounted rods 114 and 115 and the end bolts 109, to provide a normal crown curvature as required for straight sections of a roadway to be finished. If the change of camber of the floats is to be accomplished automatically on raising and lowering the center or inner ends of the float frames, the camber also must be as required when the float frames are at their normal finishing heights relatively to the central girder 11a. Furthermore, the slack in the cable 132 operating the cam levers 128 must be adjusted so that when the central portions of the float frames are adjusted to the height necessary for finishing the principal radius portion of a superelevated curve, the upper ends of the cam levers 128 will be drawn inwardly by the cables 132 to remove camber from the floats to a required degree. Once these initial adjustments have been made no further adjustment will be required except to compensate for wearing down of the floats.

Figure 13:
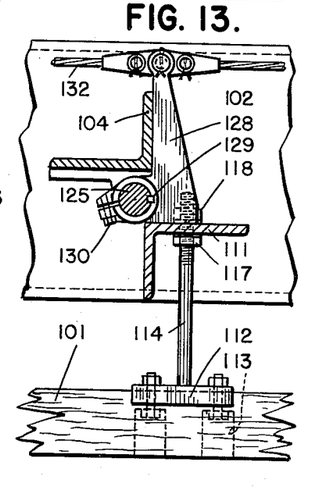
Fig. 13 is an enlarged fragmentary sectional view taken on the line 13—13 of Fig. 10.

If the cam levers 132 are to be operated by an independent control mechanism, no such critical initial adjustment is required, and it is only necessary to adjust the floats for the proper camber for a straightaway section of the roadway with the cam levers 132 in the normal or unoperated position, as shown in Fig. 13. Thereafter independent controlled operation of the cam lever actuating mechanism permits changing the camber of the floats as required by the operator.

Figures 17, 18:
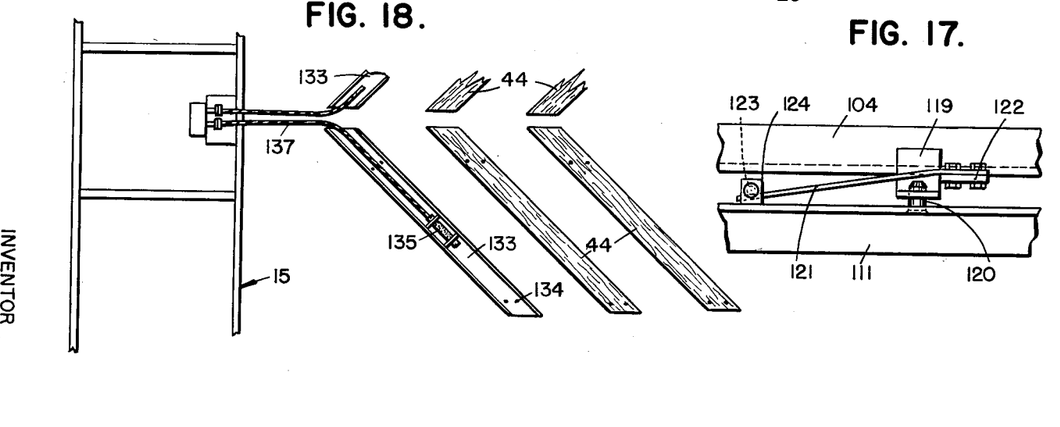
Fig. 17 is a side elevational view of the fragment shown in Fig. 12.
Fig. 18 is a somewhat diagrammatic view of a vibrator attached to a modified front float.

In order to assist in the achievement of the desired type of finished surface and to prevent gouging of the surface by rocks in the aggregate, one of the wooden float members, for example, the forward float member on each of the float frames, may be a vibrating float member, as shown in Fig. 18. These vibrating float members may comprise channel shaped floats 133 of relatively heavy steel sheet, for example, 16 gauge. These channeled float members may be mounted on supporting bolts 134 secured to the channeled float members, to extend upwardly therefrom in the same manner as the rods 114 and 115 illustrated in Fig. 13. These bolts may be secured to the inverted angle iron members 111, as in Fig. 13, for use on a variable camber machine. If a vibrator type float is desired on a machine such as that illustrated in Figs. 1-3 or the modified variation illustrated in Fig. 4, the bolts may be secured directly to the float frame support brackets the same as in mounting the wooden floats 44.

A vibrator head 135 which may be of a type employed to tamp concrete and which comprises a rotatable shaft having an eccentric weight mounted thereon, is connected as by means of a flexible drive shaft 137 to a driving mechanism which may be a take-off drive from the propelling engine 18 or, if desired, it may be a separate independent auxiliary power plant, not illustrated. The vibrator heads 135 produce a pronounced vibration of the channeled floats 133.

At present it is common practice to employ heavy rollers and sprinklers which travel back and forth across the surface of a paving strip in the process of being finished. The use of such extraneous equipment is unnecessary with my present finisher when equipped with the vibrating floats as described above.

The arrangement of the floats on two sides of the main supporting framework works the surface of the concrete back and forth on each side of the center line, removing excess material and transferring it diagonally to spots where there may be a deficiency. The excess material is deposited in windrows either centrally between the apexes of the floats or laterally along the sides of the machine. By the action of the diverter blocks, this material is either deposited in the path of the floats so as to be picked up on the next successive pass of the machine, or, at the option of the operator, may be discharged overboard on a final pass of the machine. While normally the same material is worked back and forth by the same side of the machine to smooth each half of the pavement slab independently from the other, excess material in the central windrow can be diverted in any desired quantity toward either side of the float assembly by properly adjusting the diverter blade during a forward movement of the machine.

While I have illustrated and described a preferred embodiment of my invention and some modifications thereof, it will be apparent to those familiar with the art that the device is capable of further modifications without departing from the spirit of my invention. It is desired, therefore, not to limit the invention except as set forth in the following claims.

I claim:

1. In a cement pavement finisher having a main frame comprising front and rear wheeled carriages with longitudinally disposed frame members pivotally connected at their front and rear ends respectively to said carriages; a composite float frame comprising a pair of semi-frames hingedly connected to each other about a longitudinal axis located substantially centrally of said main frame, adjustable support means supporting said frame at its center from said main frame, whereby said hinged connection may be adjustably raised and lowered, independently adjustable supporting means for supporting each outer edge of said frame from said main frame, and a plurality of floats adjustably connected to said float frames.

2. In a cement pavement finisher having a main frame comprising front and rear wheeled carriages with longitudinally disposed frame members pivotally connected at their front and rear ends respectively to said carriages; a composite float frame comprising a pair of semi-frames hingedly connected to each other about a longitudinal axis located substantially centrally of said main frame, adjustable support means supporting said frame at its center and two outer edges from said main frame, a plurality of floats having their ends adjustably connected to said float frames, and controllable float warping means acting between said float frame and said floats to vary the camber of the floats during a pavement traversing movement of the finisher.

3. In a cement pavement finisher having a main frame comprising laterally extendable front and rear wheeled carriages with longitudinally disposed frame members pivotally connected at their front and rear ends respectively to said carriages; a composite float frame comprising a pair of semi-frames hingedly connected to each other about a longitudinal axis located substantially centrally of said main frame, adjustable support means supporting said frame at its center and two outer edges from said main frame, vertically movable connections between the composite float frame and the main frame, a plurality of floats having their ends adjustably connected to said float frames, controllable float warping means acting between said float frame and said floats to vary the camber of the floats during a pavement traversing movement of the finisher, and means operably connecting the warping means to the main frame to operate the warping means on a predetermined change in relative vertical position between the main frame and the float frame.

4. A cement pavement finisher comprising a main frame having a wheeled front carriage, a wheeled rear carriage, a plurality of longitudinal frame connecting elements pivotally connected at the forward and rear ends thereof respectively to the front and rear carriages, and a plurality of carriage extension units interposed between elements of said front and rear carriages to increase the width thereof by selected increments; a plurality of float frames mounted in said main frame, adjustable support means carried by said main frame and connected to selected float frames adjustably to support said float frames from said main frame, a plurality of floats mounted on said float frame, said floats having their forward ends adjacent a center line of the main frame, said floats extending diagonally rearward in substantial parallelism with each other on opposite sides of the main frame center line and terminating adjacent the sides of the main frame, means for adjusting the longitudinal curvature of said floats to vary the crown curvature of a pavement finished thereby, and a triangular diverter block adjustably mounted adjacent a rear outer end of the floats in the longitudinal path of material diverted laterally by said floats, the apex of said triangular diverter block extending inwardly beyond the outer ends of said floats and substantially on the plane of the lower faces thereof.

5. A cement pavement finisher comprising a main frame having a wheeled front carriage, a wheeled rear carriage, a plurality of longitudinal frame connecting elements pivotally connected at the forward and rear ends thereof respectively to the front and rear carriages, and a plurality of carriage extension units interposed between elements of said front and rear carriages to increase the width thereof by selected increments; a plurality of float frames mounted in said main frame, adjustable support means carried by said main frame and connected to selected float frames adjustably to support said float frames from said main frame, a plurality of floats mounted on said float frame, said floats having their forward ends adjacent a center line of the main frame, said floats extending diagonally rearward in substantial parallelism with each other on opposite sides of the main frame center line and terminating adjacent the sides of the main frame, means for adjusting the longitudinal curvature of said floats to vary the crown curvature of a pavement finished thereby, a triangular diverter block adjustably mounted adjacent a rear outer end of the floats in the longitudinal path of material diverted by said floats, the apex of said triangular diverter block extending inwardly beyond the outer ends of said floats and substantially on the plane of the lower faces thereof, a pivoted frame mounted to support said diagonal diverter block, a diagonally disposed diverter block carried by said pivoted frame and normally elevated above the plane of said floats, said pivoted frame being pivotally movable simultaneously to elevate the triangular block above the float level and to lower the diagonal block onto a plane with the lower faces of said floats to divert laterally outboard material diverted by said floats on a forward movement thereof.

6. A cement pavement finisher comprising a main frame having a wheeled front carriage, a wheeled rear carriage, a plurality of longitudinal frame connecting elements pivotally connected at the forward and rear ends thereof respectively to the front and rear carriages, and a plurality of carriage extension units interposed between elements of said front and rear carriages to increase the width thereof by selected increments; a plurality of float frames mounted for slidable vertical movement in said main frame, adjustable support means carried by said main frame and connected to selected float frames adjustably to support said float frames from said main frame, a plurality of floats mounted on said float frame, said floats having their forward ends adjacent a center line of the main frame, said floats extending diagonally rearward in substantial parallelism with each other on opposite sides of the main frame center line and terminating adjacent the sides of the main frame, cam means associated with each float to control the longitudinal curvature of said floats, a triangular diverter block adjustably mounted adjacent a rear outer end of the floats in the longitudinal path of material diverted laterally by said floats, the apex of said triangular diverter block extending inwardly beyond the outer ends of said floats and substantially on the plane of the lower faces thereof, a pivoted frame mounted to support said diagonal diverter block, a diagonally disposed diverter block carried by said pivoted frame and normally elevated above the plane of said floats, said pivoted frame being pivotally movable simultaneously to elevate the triangular block above the float level and to lower the diagonal block onto a plane with the lower faces of said floats to divert laterally outboard material diverted by said floats on a forward movement thereof.

7. A cement pavement finisher comprising a wheeled main frame including a plurality of longitudinal girders, a float frame adjustably suspended from said girders, guiding connection means between the main frame and the float frame to prevent lateral displacement of the float frame relatively to the main frame, a plurality of V-shaped floats adjustably connected to said float frame for individual vertical adjustment relatively thereto, said floats being arranged in a line of parallel V's with their apexes pointing forwardly and adjacent the longitudinal center line of the main frame, the floats of each V being separated slightly from each other at the apex, and a diverter block having pointed front and rear ends mounted substantially on the longitudinal center line of the machine, and longitudinally between the apexes of the forward and rearward floats, said diverter block being on a level with the lower faces of the floats adjacent thereto.

8. A cement pavement finisher comprising a wheeled main frame including a plurality of longitudinal girders, a float frame adjustably suspended from said girders, guiding connection means between the main frame and the float frame to prevent lateral displacement of the float frame relatively to the main frame, a plurality of V-shaped floats adjustably connected to said float frame for individual vertical adjustment relatively thereto, said floats being arranged in a line of parallel V's with their apexes pointing forwardly and adjacent the longitudinal center line of the main frame, the floats of each V being separated slightly from each other at the apex, and an adjustable blade pivotally mounted on the longitudinal center line of the finisher on a level with the bottoms of the floats adjacent the center line, to divert cement material discharged through the open apexes of the V-shaped floats during a rearward movement of the finisher, toward a selected side of the apex during a forward movement of the finisher.

9. A cement pavement finisher comprising a main frame having a wheeled front carriage and a wheeled rear carriage, axially adjustable wheels mounted on each of said carriages to vary the tread width thereof, power drive means mounted on one of said carriages and having splined adjustable driving connection with wheels thereof, a plurality of longitudinal frame girders pivotally connected at their front and rear ends to the front and rear carriages, a pair of float frames adjustably supported from said girders, a plurality of V-shaped floats mounted on said float frames, said floats being arranged in V form with their apexes pointing forwardly, the apex of each V being open, diverter means mounted in line with the open end of said V's to divide and divert residual material passing through the open apexes of said V's, and means for moving a selected portion of the residual material to either side of the opening of said V's.

10. A cement pavement finisher comprising a main frame having a wheeled front carriage and a wheeled rear carriage, axially adjustable wheels mounted on each of said carriages to vary the tread width thereof, power drive means mounted on one of said carriages and having splined adjustable driving connection with wheels thereof, a plurality of longitudinal frame girders pivotally connected at their front and rear ends to the front and rear carriages, a float frame adjustably supported from said girders, a plurality of V-shaped floats mounted on said float frames, said floats being arranged in V form with their apexes pointing forwardly, the apex of each V being open, diverter means mounted in line with the open end of said V's to divide and divert residual material passing through the open apexes of said V's, means for moving a selected portion of the residual material to either side of the opening of said V's, and means acting between the float frame and said floats simultaneously to vary the longitudinal curvature of said floats during a traversing movement of the finisher thereby to vary the crown imparted to a pavement by the floats.

11. A cement pavement finisher comprising a main frame having a wheeled front carriage and a wheeled rear carriage, axially adjustable wheels mounted on each of said carriages to vary the tread width thereof, power drive means mounted on one of said carriages and having splined adjustable driving connection with wheels thereof, a plurality of longitudinal frame girders pivotally connected at their front and rear ends to the front and rear carriages, a float frame adjustably supported from said girders, a plurality of V-shaped floats mounted on said float frames, said floats being arranged in V form with their apexes pointing forwardly, the apex of each V being open, diverter means mounted in line with the open end of said V's to divide and divert residual material passing through the open apexes of said V's, means for moving a selected portion of the residual material to either side of the opening of said V's, cam means acting between the float frame and said floats simultaneously to vary the longitudinal curvature of said floats during a traversing movement of the finisher thereby to vary the crown imparted to a pavement by the floats, and cam control means connected between the float frame and the main frame to actuate said cam means on a predetermined change in relative position between the float frame and the main frame.

12. In a cement pavement finisher having a wheeled main frame, a float frame supported by said main frame, a plurality of elongate floats connected at their ends to said float frame, a plurality of laterally spaced frame members extending across the floats between the ends thereof, each of said frame members being secured to each of said floats, spring means acting to force said frame members towards said float frame, and adjustable means including cam means for moving said frame members away from said float frame against the action of the spring means, whereby the floats are substantially correspondingly warped between their ends to vary the crown imparted to a pavement by the floats.

CLARENCE G. SCHULZE.

REFERENCES CITED

The following references are of record in the file of this patent:

UNITED STATES PATENTS

| Number | Name | Date |
|---|---|---|
| 1,662,257 | Valerio | Mar. 13, 1928 |
| 2,150,618 | Blackwell | Mar. 14, 1939 |
| 2,194,754 | Johnson | Mar. 26, 1940 |
| 2,227,296 | Costello | Dec. 31, 1940 |
| 2,235,105 | Heltzel | Mar. 18, 1941 |
| 2,241,299 | Finley | May 6, 1941 |
| 2,306,126 | Jackson | Dec. 22, 1942 |